Dec. 27, 1938.                R. G. SANDS                2,141,490
                           SUBSTATION PROTECTOR
                            Filed July 29, 1935
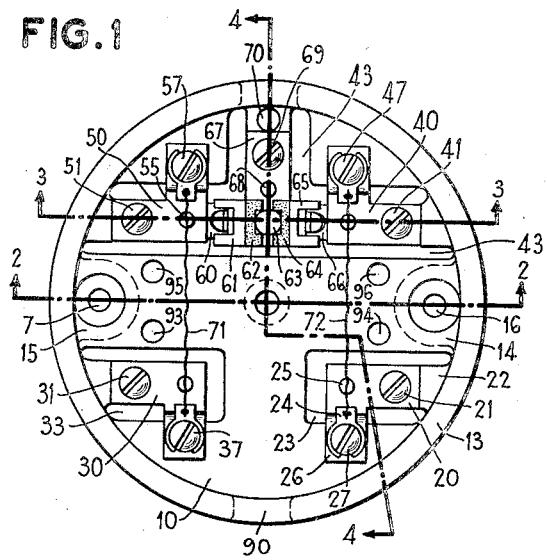
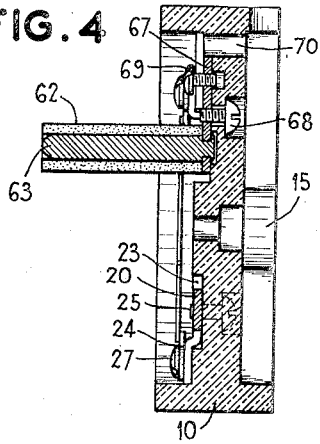
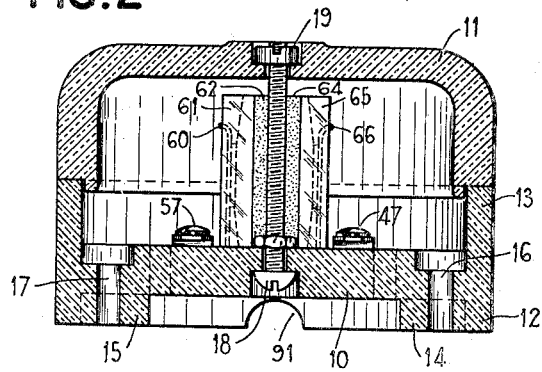
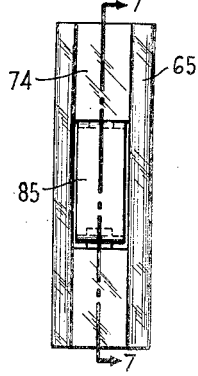
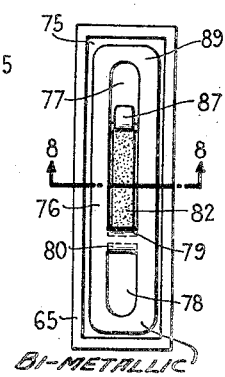
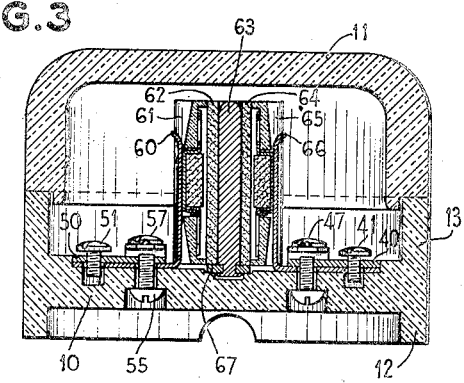
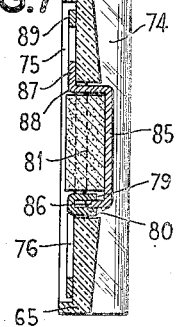
INVENTOR.
ROY G. SANDS
BY
ATTORNEY.

Patented Dec. 27, 1938

2,141,490

UNITED STATES PATENT OFFICE 2,141,490

SUBSTATION PROTECTOR

Roy G. Sands, Waukegan, Ill., assignor, by mesne assignments, to Associated Electric Laboratories, Inc., Chicago, Ill., a corporation of Delaware Application July 29, 1935, Serial No. 33,735

5 Claims. (Cl. 175—30)

The present invention relates to substation protectors, for subscribers' telephone stations, and the object of the invention is to provide an economical and efficient protector of this character.

A feature of the invention is a protector which combines fuses and lightning arresters all enclosed in a small ornamental casing of porcelain.

Another feature of the invention is a new and improved thermal arrester block. As to this feature the invention may be considered as an improvement on my prior Patents Nos. 1,656,076 and 1,656,989.

The invention will be described hereinafter with reference to the accompanying drawing, comprising Figs. 1 to 8, inclusive.

In the drawing, Fig. 1 is a top or plan view of the protector with cover removed; Fig. 2 is a cross-section on the line 2—2, Fig. 1, with the cover in place; Fig. 3 is a similar cross-section on the line 3—3, Fig. 1; Fig. 4 is a cross-section on the line 4—4, Fig. 1; Fig. 5 is a view of one side of the new thermal protector block; Fig. 6 is a view of the other side of the block; Fig. 7 is a cross-section on the line 7—7, Fig. 5; while Fig. 8 is a cross-section on the line 8—8, Fig. 6.

The casing of the protector is of porcelain and comprises a base 10 and a cap or cover 11. The base appears in Figs. 1 to 4, inclusive, and the cap in Figs. 2 and 3. The figures are full size, from which it may be seen that the complete protector is about 3⅜ inches in diameter and 2 inches high.

The base is arranged to be mounted on a wall by means of screws which pass through holes 16 and 17. The lower side of the base, see Figs. 2 to 4, is provided with a rim 12 which rests against the wall. At the points where the holes 16 and 17 perforate the base reinforcing abutments 14 and 15 are provided, integral with the rim 12. This construction appears in Fig. 2 and Fig. 1 shows the abutments in dotted lines. The abutment 15 also can be seen in Fig. 4.

The cover 11 is shown clearly in Figs. 2 and 3. To hold the cover in place there is a bolt 18 which passes through a hole at the center of the base and through a corresponding hole in the center of the cover. A nut 19 clamps down the cover. There may also be a nut screwed down on bolt 18 at the upper surface of the base, as shown in Fig. 2, to hold the bolt 18 in place at times when the cover is removed.

On the upper side of the base 10 there is a rim 13, which with the sides of cover 11 forms a cavity within which the parts are mounted. These parts are attached to the base 10, which is provided with suitable recesses and shoulders to assist in securing the parts firmly and in the proper relation to one another.

Considering first the fuse terminal 20, this comprises an L-shaped piece of metal 26, lying in a recess 23, with one end abutting against a shoulder 22, and the other end, which is offset, resting on the base outside the recess 23. The screw 25 holds the terminal in place. Screw 21 is for attaching a line wire, as will be subsequently explained. Screw 27 is for securing the fuse clip 24. Most of these parts can also be seen in Fig. 4, which should make the construction clear.

Arranged symmetrically with the fuse terminal 20 is a second fuse terminal 30, mounted in a recess 33. The terminal 30 is exactly the same as terminal 20.

Opposite the fuse terminals 20 and 30 are arranged two fuse terminals 40 and 50, mounted in a recess 43. The terminals 40 and 50 are identical with terminals 20 and 30.

A fuse 71 extends between fuse terminals 30 and 50, the clips at the ends of the fuse being secured beneath screws 37 and 57. A similar fuse 72 extends between the fuse terminals 20 and 40 and the fuse clips are held by screws 27 and 47.

The recess 43 is slightly deeper than recesses 23 and 33 to allow for the insertion beneath the fuse terminals 50 and 40 of L-shaped springs 60 and 66, respectively. Referring to Fig. 3 it will be seen that spring 60 has a horizontal portion that is clamped below fuse terminal 50 by means of screw 55. The vertical portion of the spring is narrower than the horizontal portion, being of the proper width to fit within the side slot of a protector block such as 61, and has a curved portion at the end to facilitate the insertion of such block.

The spring 66 is similar to spring 60 and is mounted the same way.

The arrangement of the ground post 63 is shown in Figs. 1, 3, and 4. The bottom of this post is riveted to a flat piece of metal 67, which is firmly secured to the base 10 by means of a screw 68. Screw 69 is provided for attachment of a ground wire.

Between the spring 60 and the ground post 63 there is inserted a pair of protector blocks 61 and 62. A similar pair of blocks 65 and 64 is inserted between the ground post 63 and the spring 66. These blocks may be the standard carbon blocks in common use and in this case are separated by the usual dielectric, generally a thin perforated strip of Celluloid. However, the blocks 61 and 65 may be of the thermal type shortly to be described herein, in which case no dielectric is used. The drawing shows the blocks 61 and 65 of the new thermal type, paired with carbon blocks 62 and 64.

The thermal block 65 is shown in detail in Figs. 5 to 8, inclusive. It comprises a main body portion of porcelain. On one side of the block there is a wide groove or slot 74, for reception of a spring such as 66 when the block is in use. On the other side of the block there is a rectangular recess or depression 75, within which is positioned a bi-metallic thermal element 76. The element 76 has openings 77 and 78. A portion of the metal removed in forming these openings is used to form the two ears 79 and 80 which are thus integral with the element 76. These ears are bent at right angles to the main portion of 76, as seen in Fig. 7.

At about the center of the block there is a rectangular opening in alignment with a portion of the opening 77 in element 76. Within this opening there is positioned a small carbon block 81. As seen in Fig. 8, the carbon 81 has a narrow portion 82 which lies in the opening in the block 65 and which passes through the opening 77 of element 76, and has a head portion 83 of greater width which lies in a rectangular recess 84 in the block 61.

The thermal element 76 and the carbon 81 are held in position in the block 65 by means of a metallic member 85, seen clearly in Fig. 7. Before assembly of the block the member 85 is U-shaped, there being no bend at 88. To assemble the block the thermal element 76 is placed in position in recess 75, with the two ears 79 and 80 lying in one end of the opening provided for carbon 81. The carbon 81 is then inserted in the position shown. The member 85 is then put in place, the end 87 passing through the opening in block 65 at one end of carbon 81 and the end 86 being inserted between the two ears 79 and 80. While the parts are firmly pressed together in this position the end 86 is secured to the ear 80 by soldering, and the end 87 is bent over at 88. The ears 79 and 80 are, of course, well tinned before assembly, as is the end 86 of member 85, and in the soldering operation the solder usually runs well enough to secure attachment of 86 to both ears 79 and 80. This is not essential, however.

As seen in Fig. 3, the left-hand face of the block 65 lies against the face of the carbon block 64, but due to the fact that the element 76 lies in a recess of block 65, this element does not normally contact block 64. When heated, however, the element 76 assumes a curved shape and the end 89, Figs. 6 and 7, moves toward the carbon block 64 to engage it. The carbon 81 also has its face wholly within the recess 75 of block 65 and therefore does not touch the block 64. The separation may be about .005 inch and is preferably secured to the desired accuracy by grinding off the face of carbon 81 after the block 65 is assembled.

A protector of the type described herein is used to protect a telephone against lightning and foreign currents on the telephone line due to induction or crosses with other lines such as power lines. For this purpose the protector may be mounted on the inner wall of the building near the point where the line wires enter. The line wires enter the protector through an opening 90 in the lower rim 12. The opening 90 is shown in dotted lines in Fig. 1 and is similar to the opening 91, Fig. 2. One line wire passes up through a hole 93, Fig. 1, and is secured beneath the screw 31. The other line wire passes up through a hole 94 and is secured under the screw 21. The two wires from the telephone instrument enter the protector at 91, Fig. 2, pass up through holes 95 and 96, Fig. 1, and are secured beneath screws 51 and 41. The ground wire enters either at 90 or 91, depending on whether an outside or inside ground is used, passes up through hole 70, and is secured beneath screw 69.

When currents due to lightning come in over the line, arcing takes place between the carbons such as 81 of blocks 61 and 65 and the carbon blocks 62 and 64. If strong enough these currents may blow the fuses 71 and 72, and when this occurs the outside line is, of course, disconnected. The operation may therefore be similar to the operation of the ordinary protector under some conditions.

Repeated lightning discharges may take place, however, which do not blow the fuses but which nevertheless cause a great deal of arcing between the carbons. With the ordinary protector using carbon blocks the blocks soon become ruined by the arcing and have to be replaced. When the thermal block shown herein is used, however, the thermal elements such as 76 become heated after a little arcing has taken place and bend over to touch the carbon blocks 62 and 64, thus putting a solid ground on the line and preventing further arcing. This condition endures for a while, until sufficient heat is dissipated to permit the thermal elements such as 76 to restore and remove the ground. The lightning may have ceased by this time, but if not the operation of grounding the line will be repeated due to renewal of the arcing and consequent generation of heat. It will be seen, therefore, that while the new thermal block does not altogether eliminate arcing at the carbons, it limits the arcing to relatively short periods and thus adds greatly to the life of the carbons.

The new thermal blocks are especially valuable in taking care of crosses with low voltage power lines such as are used for house lighting. When such a cross occurs, a substantially continuous spitting or arcing will take place at the carbons of the protector, which in time would greatly damage the ordinary carbon blocks. With the thermal protector, however, the heat generated very shortly operates the thermal elements of the blocks and grounds the line. In the case of a solid cross with a power line the grounding of the line will usually blow the fuses and open the line. While this puts the instrument out of service, it is out of service anyway because of the cross, and the opening of the line at least saves injury to the protector blocks and to the telephone instrument. If the cross is not solid or is so far away that the current resulting from grounding the line is not sufficient to blow the fuses, the block and instrument are temporarily protected by the grounding of the line. The ground is removed after time enough has elapsed for the thermal elements to cool, and by this time the cross may have become clear.

The invention having been described, that which is believed to be new and for which protection of Letters Patent is desired will be pointed out in the appended claims.

What is claimed is:

1. A protector block for lightning arresters comprising a main body of porcelain, an insert of carbon to provide a discharge face on one side of said block, and a member supporting said insert and having an infusible bi-metallic element the surface of which lies in a plane parallel to said discharge face, a portion of said surface moved from one side or the other of said discharge face depending on its temperature.

2. A protector block for lightning arresters comprising a main body of porcelain, said body having a recess on one side, a bi-metallic thermal element located in said recess, a carbon insert having a discharge face within said recess, and a fastening member cooperating with said thermal element and said carbon insert to permanently secure said thermal element, said carbon insert and said fastening member to the porcelain body of the block to form a unitary structure.

3. A protector block for lightning arresters comprising a block of porcelain having an opening therein, a thermal element on one side of said block and having an opening in line with the said first opening, a carbon element having a shank portion passing through said openings and having a head portion recessed in the block on the side opposite said thermal element, and a U-shaped metal clip for holding said carbon element in place, said clip having one end soldered to said thermal element and having the other end passed through the opening in the porcelain block and bent over against the porcelain to hold it in position.

4. A lightning arrester comprising a block of conductive material and a block of insulating material, a shallow recess in one face of said second block, means for supporting said blocks in contact with each other so that said first block covers said recess to form a restricted discharge chamber, a conductive member inserted in the body of said second block and having one face within said chamber, said face cooperating with the adjacent face of said first block to form a discharge gap, a flat bi-metallic strip surrounding said one face and normally lying at the bottom of said recess below the plane of said gap, means for rigidly securing said strip to said second block leaving one end free to move toward said first block, and a conductive connection between said strip and member whereby contact between said strip and first block established by heating said strip will short circuit said discharge gap.

5. In a protector block for lightning arresters, a main body of insulating material, said body having a shallow recess on one side and a restricted opening extending from the bottom of the recess to the other side of said body, a flat bi-metallic strip positioned at the bottom of said recess, a discharge block positioned in said opening and having a discharge face in said recess, and a single metallic member permanently securing both said strip and discharge block to said body and serving when the block is mounted in a lightning arrester, to conductively connect both of them to the circuit to be protected.

ROY G. SANDS.